(12) United States Patent
Rodecker

(10) Patent No.: US 8,608,117 B2
(45) Date of Patent: Dec. 17, 2013

(54) ISOLATOR HAVING PUSH AND TURN MOUNTING

(75) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 255 days.

(21) Appl. No.: 13/008,978

(22) Filed: Jan. 19, 2011

(65) Prior Publication Data
US 2012/0181411 A1    Jul. 19, 2012

(51) Int. Cl.
*E21F 17/02*    (2006.01)
*F16L 3/00*    (2006.01)

(52) U.S. Cl.
USPC ............ 248/58; 248/59; 248/634; 403/261; 403/349

(58) Field of Classification Search
USPC ............ 248/58, 59, 49, 634; 411/383, 399; 403/261, 349, 194
See application file for complete search history.

(56) References Cited

U.S. PATENT DOCUMENTS

| | | | | |
|---|---|---|---|---|
| 2,250,199 | A * | 7/1941 | Kelly | 285/99 |
| 2,912,198 | A * | 11/1959 | Feil, Jr. | 248/589 |
| 4,756,638 | A * | 7/1988 | Neyret | 403/261 |
| 5,127,489 | A * | 7/1992 | Takato et al. | 180/309 |
| 5,301,985 | A * | 4/1994 | Terzini | 285/79 |
| 5,423,778 | A * | 6/1995 | Eriksson et al. | 604/305 |
| 5,641,310 | A * | 6/1997 | Tiberio, Jr. | 439/680 |
| 6,058,562 | A | 5/2000 | Satou et al. | |
| 6,070,849 | A | 6/2000 | Larmande et al. | |
| 6,095,460 | A | 8/2000 | Mercer et al. | |
| 6,572,070 | B2 * | 6/2003 | Arciero et al. | 248/610 |
| 6,739,557 | B2 | 5/2004 | Kato | |
| 6,758,300 | B2 * | 7/2004 | Kromis et al. | 180/309 |
| 6,851,506 | B2 * | 2/2005 | Bovio | 180/296 |
| 6,854,561 | B2 | 2/2005 | Bass | |
| 6,942,255 | B2 * | 9/2005 | Pickering | 285/136.1 |
| 7,165,645 | B2 | 1/2007 | Chae | |
| 7,510,043 | B2 | 3/2009 | Cerri, III | |
| 7,644,911 | B2 * | 1/2010 | Rodecker | 267/293 |

FOREIGN PATENT DOCUMENTS

| | | |
|---|---|---|
| JP | 07-032893 A | 2/1995 |
| JP | 2005-325802 A | 11/2005 |
| WO | 2009-111117 A1 | 9/2009 |

OTHER PUBLICATIONS

Search Report and Written Opinion dated Apr. 30, 2012 in corresponding PCT Application No. PCT/US2011/065041.

* cited by examiner

*Primary Examiner* — Amy J Sterling
(74) *Attorney, Agent, or Firm* — Harness, Dickey & Pierce, P.L.C.

(57) ABSTRACT

An elastomeric assembly is disposed within an aperture defined by a supporting structure of a vehicle. The elastomeric assembly is movable between a first position where the elastomeric assembly can move axial within the aperture and a second position where the elastomeric assembly is prohibited from moving axially within the aperture.

21 Claims, 5 Drawing Sheets

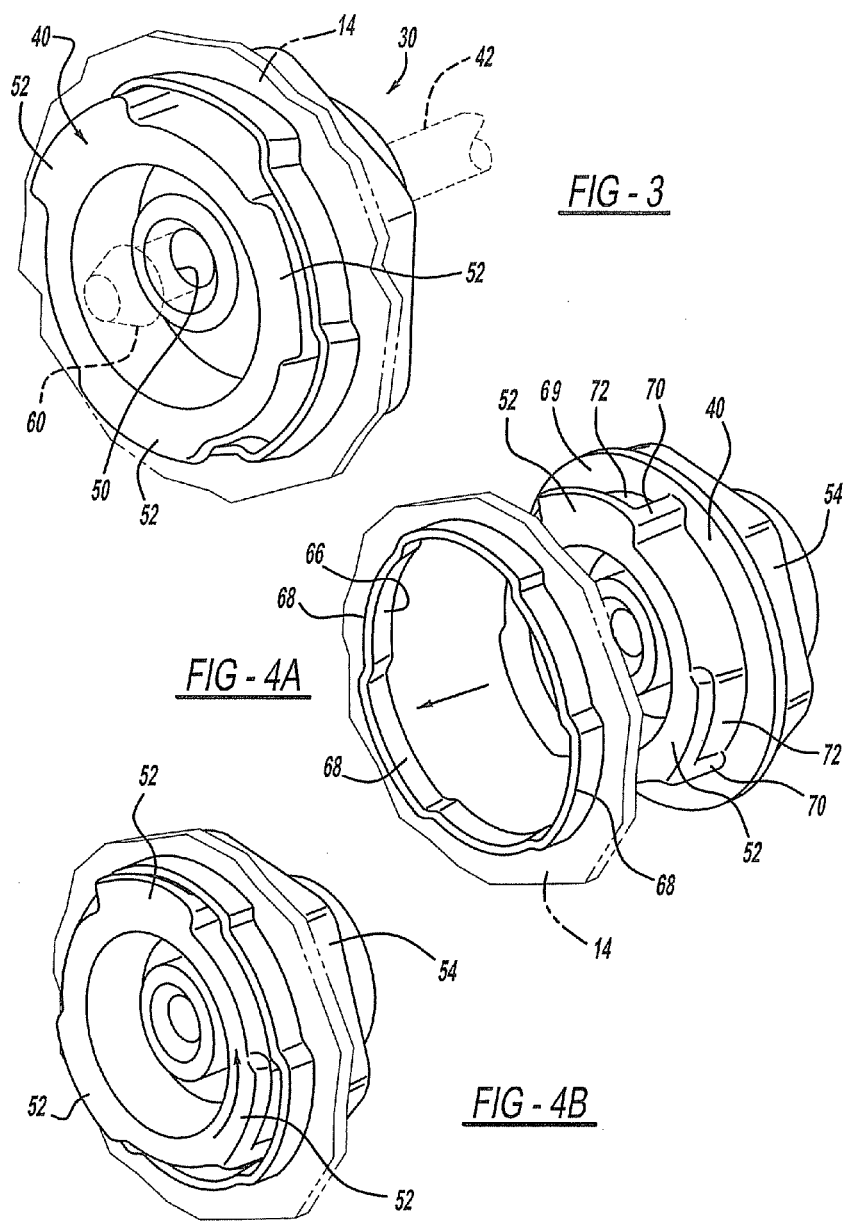

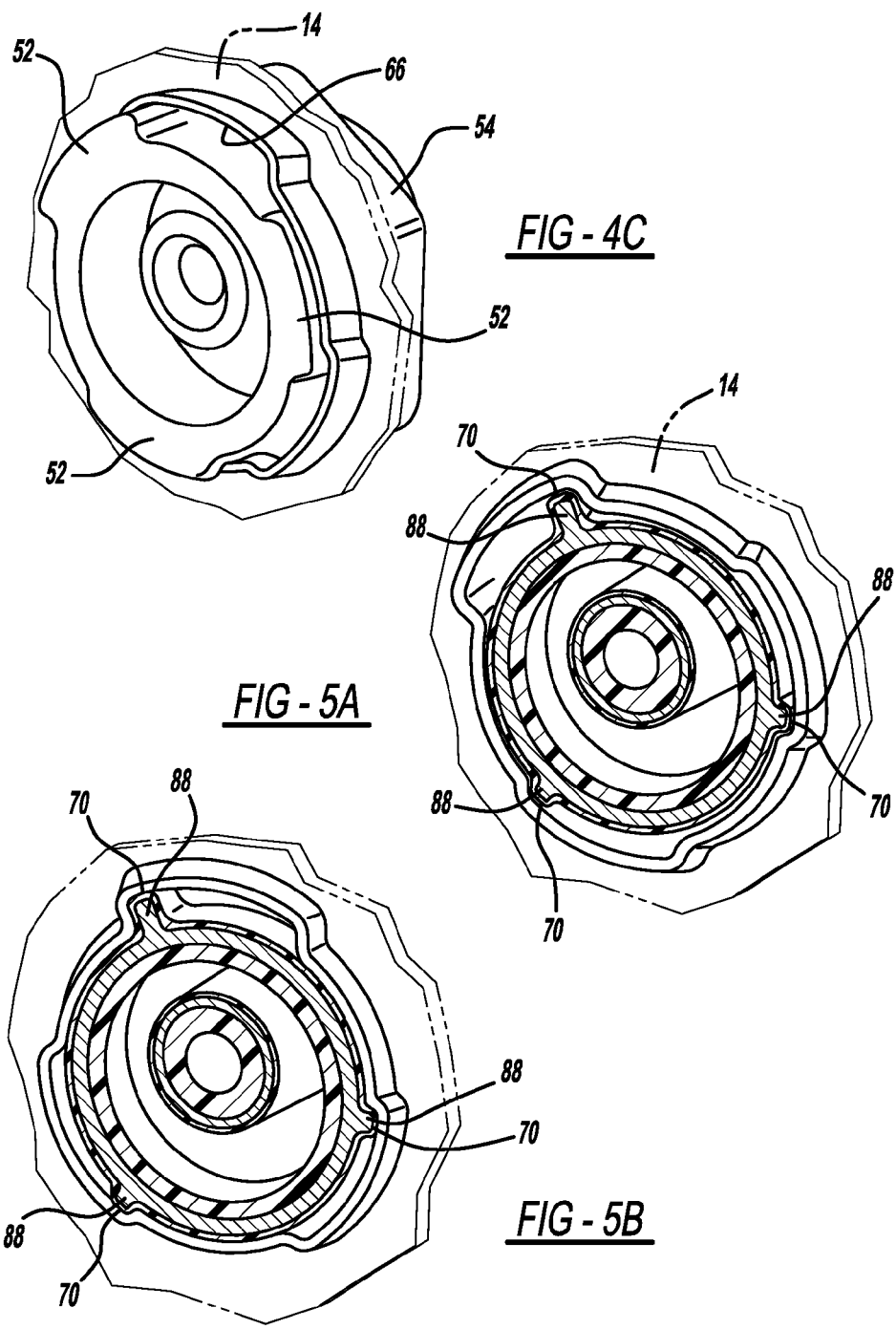

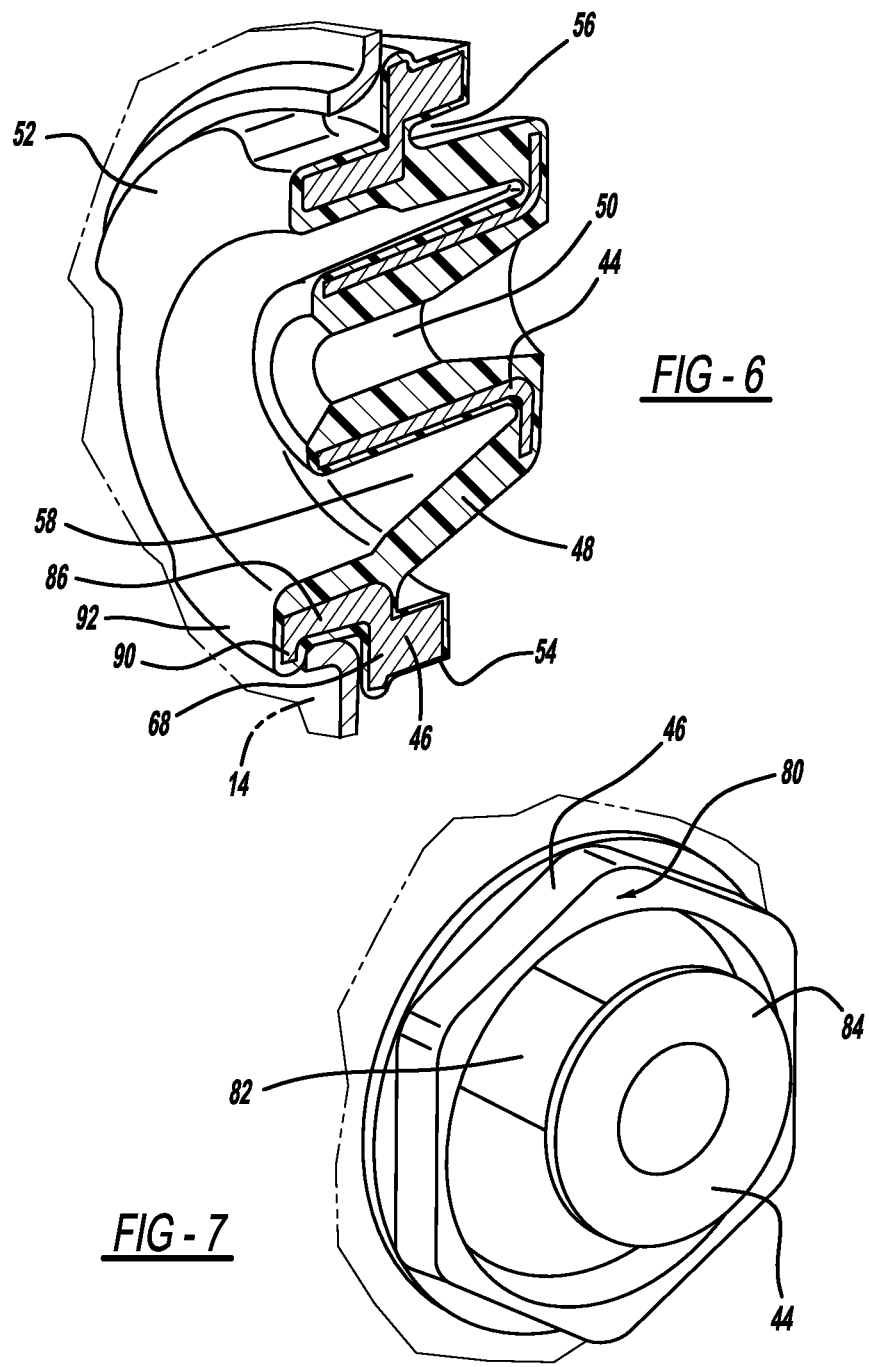

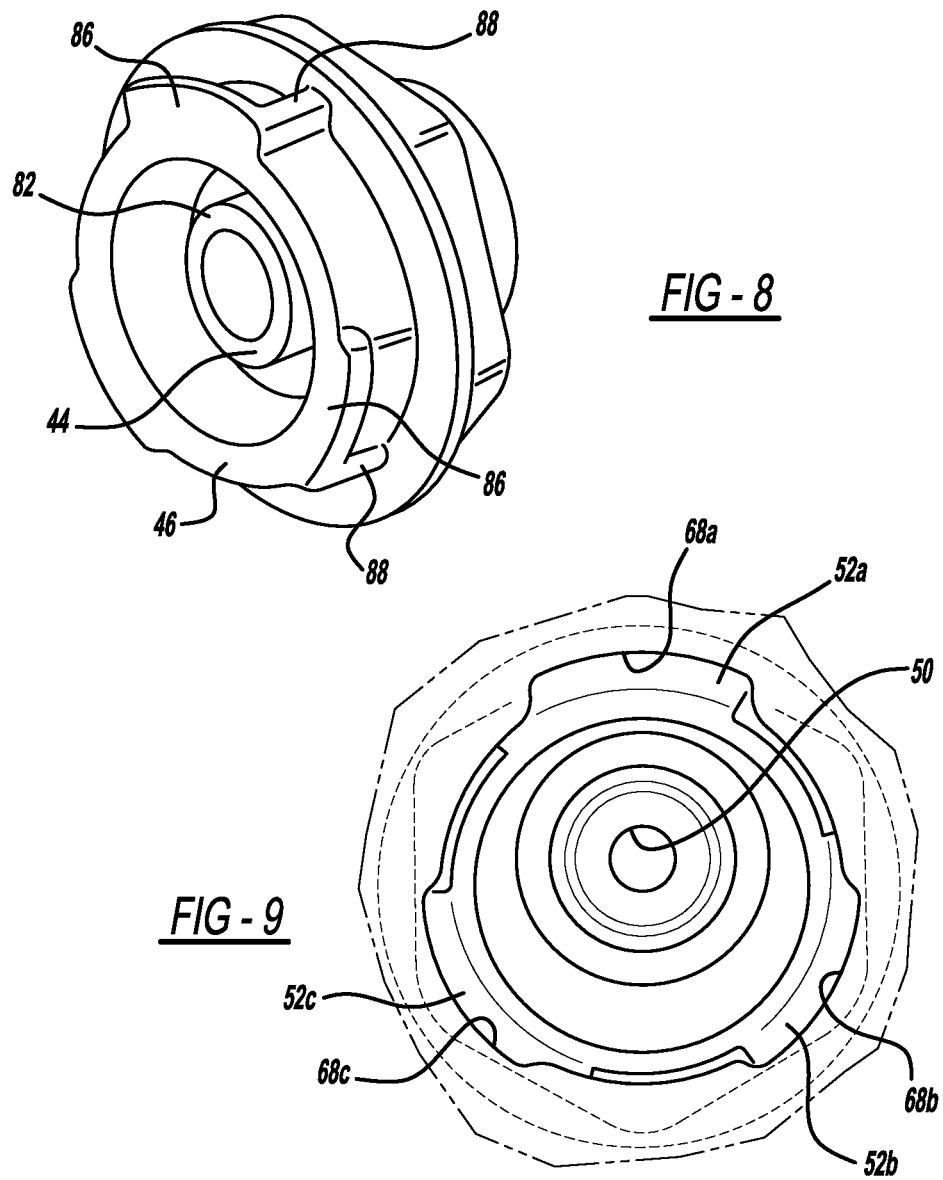

ISOLATOR HAVING PUSH AND TURN MOUNTING

FIELD

The present disclosure relates to a mounting arrangement for an exhaust system of a vehicle. More particularly, the present disclosure relates to an exhaust isolator which is mounted directly to a vehicle's frame or underbody, thus eliminating the need for brackets, bolts, welded frame nuts, clipped in frame nuts or the like.

BACKGROUND

The statements in this section merely provide background information related to the present disclosure and may not constitute prior art.

Typically, automotive vehicles, including cars and trucks, have an internal combustion engine which is coupled to at least a transmission and a differential for providing power to the driven wheels of the vehicle. An engine exhaust system which typically includes an exhaust pipe, a catalytic converter, a muffler and a tail pipe is attached to the engine to quiet the combustion process, to clean the exhaust gases and to route the products of combustion away from the engine. The exhaust system is supported by exhaust mounts or isolators which are positioned between the exhaust system and the frame, the underbody or some other supporting structure of the vehicle's body. In order to prevent engine movement and/or vibrations from being transmitted to the vehicle's body, the exhaust mounts or isolators incorporate flexible mounting members or elastic suspension members to isolate the vehicle's body from the exhaust system.

Typical prior art exhaust mounts or isolators include an upper hanger which is attached to the vehicle's frame or other support structure of the vehicles' body. The upper hanger extends from the support structure such that it positions an elastomeric isolator at the proper location to accept a lower hanger which extends from the elastomeric isolator to one of the exhaust system's components. The elastomeric isolator is secured in a specific location between the upper hanger and the lower hanger. Typically, the upper hanger includes assembly hardware such as stamped brackets, bolts, welded frame nuts, clip-in frame nuts and/or formed rods which are utilized to secure the upper mount to the frame or other supporting structure and to secure the elastomeric isolator to the upper mount. This hardware increases the costs and the amount of labor necessary for the construction and assembly of the vehicle.

SUMMARY

The present disclosure describes an engine mount or isolator which is mounted directly to the vehicle's frame or other supporting structure of the vehicle's body. The direct attachment of the exhaust mount or isolator eliminates the need for the upper hanger and all of the associated hardware. The exhaust mount or isolator can be fit directly within an aperture formed in the support structure. The elastomeric portion of the exhaust mount or isolator includes a hole which accepts a support rod or lower hanger which is attached to a component of the exhaust system. The support rod or lower hanger can be formed to position the component of the exhaust system in the desired location. The exhaust mount or isolator includes a push and turn mounting system which simplifies assembly of the exhaust mount or isolator to the vehicle.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a perspective view of the exhaust isolator illustrated in FIGS. 1 and 2;

FIGS. 4A-4C are perspective views illustrating the assembly of the exhaust isolator of the present disclosure;

FIGS. 5A-5B are perspective views partially in cross-section illustrating the inserts in the exhaust isolator of the present disclosure;

FIG. 6 is a perspective view in cross-section illustrating the exhaust isolator of the present disclosure;

FIG. 7 is a front perspective view of the inserts of the exhaust isolator of the present disclosure;

FIG. 8 is a rear perspective view of the inserts of the exhaust isolator of the present disclosure; and FIG. 9 is an end view of the exhaust isolator in accordance with the present disclosure illustrating an orientation feature of the exhaust isolator.

Corresponding reference numerals indicate corresponding parts throughout the several views of the drawings.

DETAILED DESCRIPTION

Example embodiments will now be described more fully with reference to the accompanying drawings.

Figure 1:
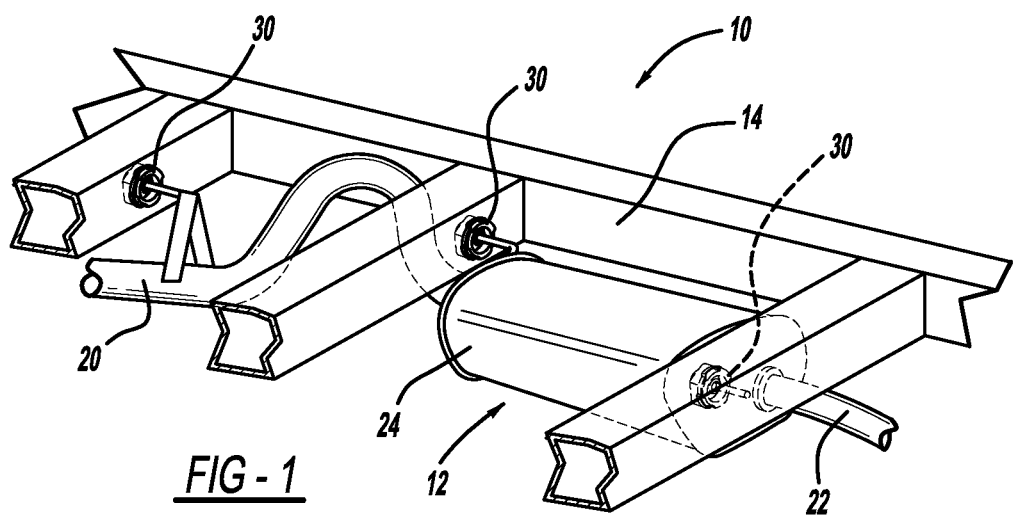
FIG. 1 is a perspective view of an exhaust system attached to a supporting structure of a vehicle with exhaust isolators in accordance with the present disclosure.
Figure 2:
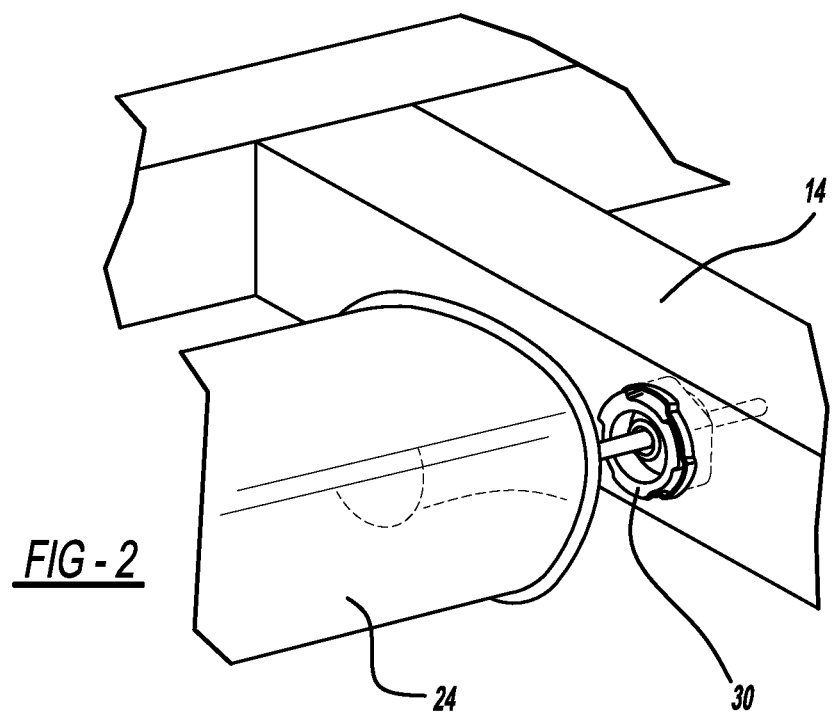
FIG. 2 is an enlarged perspective view of one of the exhaust isolators illustrated in FIG. 1.

The following description is merely exemplary in nature and is not intended to limit the present disclosure, application, or uses. There is shown in FIG. 1, an exhaust mounting system in accordance with the present disclosure which is identified generally by the reference numeral 10. Exhaust mounting system 10 attaches an exhaust system 12 to a supporting structure 14 of a vehicle. The vehicle includes an internal combustion engine (not shown), an unsprung mass including wheels and a suspension system (not shown) and a sprung mass which includes a vehicle body (not shown) which is supported by supporting structure 14. Exhaust system 12 is connected to the engine of the vehicle and exhaust system 12 routes the products of combustion of the engine to the rear of the vehicle. The internal combustion engine powers the wheels of the vehicle through a transmission (not shown) and a differential (not shown).

Exhaust system 12 comprises an intermediate pipe 22, a muffler 24, a tailpipe 26 and a plurality of exhaust isolator assemblies 30. Intermediate pipe 22 is typically connected to a catalytic converter (not shown) which is connected to an exhaust pipe (not shown) which is in turn connected to an exhaust manifold (not shown) which is one of the components of the vehicle's internal combustion engine. The catalytic converter may be connected to a single exhaust pipe which leads to a single exhaust manifold or the catalytic converter can be attached to a branched exhaust pipe which leads to a plurality of exhaust manifolds. Also, intermediate pipe 22 can be connected to a plurality of catalytic converters which connect together prior to reaching muffler 24 using a branched intermediate pipe 22 or the vehicle can have a plurality of exhaust manifolds, connected to a plurality of exhaust pipes, connected to a plurality of catalytic converters, connected to a plurality of intermediate pipes, connected to a plurality of mufflers, connected to a plurality of exhaust pipes. The present disclosure is applicable to the above described exhaust systems as well as any other exhaust system known in the art.

Exhaust system 12 is utilized to route the exhaust gases from the vehicle's engine to the rear area of the vehicle. While the exhaust gases travel from the engine to the rear of the vehicle through exhaust system 12, the catalytic cleaner cleans the exhaust gases and muffler 24 quiets the noises associated with the combustion process of the vehicle's engine. Exhaust isolator assemblies 30 provide for the support of exhaust system 12 underneath the vehicle and they operate to prevent engine movement and other vibrations from being transmitted to the vehicle's body. In addition, exhaust isolator assemblies 30 provide proper positioning and alignment for exhaust system 12 during assembly of exhaust system 12 and during the operation of the vehicle.

Referring now to FIGS. 2-8, exhaust isolator assembly 30 comprises an elastomeric assembly 40 and an hanger pin 42. Elastomeric assembly 40 comprises a first insert 44, a second insert 46 each of which is molded into an elastomeric body 48.

Elastomeric assembly 40 is a single-hole shear hub design where elastomeric body 48 defines a hole 50 which is designed to accept hanger pin 42. Hanger pin 42 is secured to one of the components of exhaust system 12 and elastomeric assembly 40 is attached to the frame or supporting structure 14 of the vehicle. Thus, exhaust system 12 is secured to the vehicle through elastomeric assembly 40. Elastomeric assembly 40 also defines a plurality of lobe flanges 52 on one end of elastomeric assembly 40 and a hexagonal structure 54 located on the end of elastomeric assembly 40 opposite to the plurality of lobe flanges 52.

Elastomeric body 48 defines an outer circumferential void 56 and an inner circumferential void 58. While voids 56 and 58 are illustrated as being asymmetrical with respect to hole 50, it is within the scope of the present disclosure to have voids 56 and 58 symmetrical to hole 50. The design of voids 56 and 58, specifically their thickness, will determine the amount of travel until the rate of elastomeric assembly 40 spikes up due to the closing of voids 56 and 58. Until the closing of voids 56 and 58, the radial loads cause pure shear stress in elastomeric body 48 regardless of the loading direction.

The loading direction of elastomeric assembly 40 can be in any radial direction around hole 50. Tuning for rate and deflection in selective directions can be accomplished independently from other directions by altering voids 56 and 58 in the appropriate circular sectors. As can be seen in FIG. 6, void 56 overlaps with void 58. The larger the overlap between voids 56 and 58, the lower the stresses and stiffness for elastomeric assembly 40. The peak loads bottom out voids 56 and 58 and start to impart compressive stress to elastomeric body 48 from hanger pin 42 and first and second inserts 44 and 46. As illustrated in FIGS. 6-8, first and second inserts 44, 46 extend around the inner and outer regions of elastomeric body 48. The bottoming of voids 56 and 58 and the subsequent compression of elastomeric body 48 makes the compressive stresses spread out rather than having the compressive stresses concentrated in a spoke or leg cross-section as in the prior art. This permits the stress magnitude to decrease as well as changing the stress loading to a more favorable type.

Hanger pin 42 is inserted through hole 50 during the installation of exhaust system 12. Hanger pin 42 is a formed rod which can include compound bends such that a first end is positioned to axially engage hole 50 and a second, opposite end is designed to mate with and be secured to a component of exhaust system 12. As illustrated, a different hanger pin 42 is used for each exhaust isolator assembly 30 but it is within the scope of the present disclosure to utilize as many common hanger pins 42 as the design for the specific application allows. An annular barb 60 is formed on the insertion end of each hanger pin 42 to resist the removal of the hanger pin 42 from hole 50.

Elastomeric assembly 40 is designed to be assembled into a flanged aperture 66 defined by supporting structure 14 of the vehicle. As illustrated in FIG. 3, aperture 66 defines a plurality of lobes 68 which are designed to correspond with and mate with the plurality of lobe flanges 52 defined by elastomeric assembly 40. The assembly of elastomeric assembly 40 is illustrated in FIGS. 4A to 4C. First, as illustrated in FIG. 4A, the plurality of lobe flanges 52 defined by elastomeric assembly 40 are aligned with the plurality of lobes 68 defined by aperture 66. A clearance around the entire circumference of elastomeric assembly 40 is provided between aperture 66 and elastomeric assembly 40 to allow the insertion of elastomeric assembly 40 into aperture 66. Elastomeric assembly 40 is pushed axially into aperture 66 as shown by the arrow in FIG. 4A until a flange 69, formed as part of hexagonal structure 54, seats against the surface of supporting structure 14 that defines aperture 66. Second, as illustrated in FIG. 4B-4C, elastomeric assembly 40 is rotated to misalign the plurality of lobe flanges 52 with the plurality of lobes 68 and thus lock elastomeric assembly 40 to supporting structure 14. A stop 70 defined by elastomeric assembly 40 contacts the side of aperture 66 when elastomeric assembly 40 has been fully rotated. Hexagonal structure 54 is provided to assist in the rotation of elastomeric assembly 40. A gap 72 defined between the plurality of lobe flanges 52 and flange 68 accommodate the flange portion of supporting structure 14 that defines aperture 66.

While elastomeric assembly 40 is designed to have a clearance fit with aperture 66 when the plurality of lobe flanges 52 are aligned with the plurality of lobes 68, the outside radial surface forming gap 72 between the plurality of lobe flanges 52 and flange 68 are designed to have an interference fit with the flanged portion of supporting structure 14 which forms the inside diameter of aperture 66 which mates with the outside radial surface forming gap 72. In this way, the compression of elastomeric body 48 within gap 72 will act as means for retaining elastomeric assembly 40 in its rotated and locked position in aperture 66.

While stop 70 is designed to indicate when elastomeric assembly 40 is in its fully assembled and locked position, it is within the scope of the present disclosure to form an indicator 80 on elastomeric assembly 40 as indicated in FIG. 7. Indicator 80 is designed to align with a mark or indicator (not shown) on supporting structure 14 when elastomeric assembly 40 is properly installed. While indicator 80 is illustrated in FIG. 7 as being located on second insert 46, indicator 80 will remain visible on elastomeric assembly 40 after the molding of elastomeric body 48. In addition, it is within the scope of the present disclosure to have indicator 80 being formed only by elastomeric body 48.

First and second inserts 44 and 46 are manufactured from plastic or metal and are illustrated in FIGS. 7 and 8. First insert 44 defines a cylindrical portion 82 which surrounds hole 50 and a flanged portion 84 which extends radially outward from cylindrical portion 82. Second insert 46 is disposed around first insert 44 and it defines indicator 80, a plurality of lobe flanges 86 and a stop 88. The plurality of lobe flanges 86 correspond to the plurality of lobe flanges 52 and stop 88 corresponds to stop 70. While the plurality of lobe flanges 52 and stop 70 are illustrated as including the plurality of lobe flanges 86 and stop 88, respectfully, it is within the scope of the present disclosure to have the plurality of lobe flanges 52 and stop 70 formed only from elastomeric body 48.

As illustrated in FIG. 6, second insert 46 includes a radially flange 90 extending radially outward from lobe flange 86. Flange 90 is included in each of the plurality of lobe flanges 52. Each flange 90 defines a radially outwardly extending flange 92 on elastomeric assembly 40 which entraps the flanged portion of supporting structure 14 that forms aperture 66 between flange 92 and flange 68.

FIG. 9 illustrates an embodiment of the present disclosure where circumferential orientation of elastomeric assembly 40 with respect to aperture 66 can be achieved. Circumferential orientation may be required when the tuning rate and deflection in selective directions has been incorporated into elastomeric assembly 40. As illustrated in FIG. 9, one of the plurality of lobes 68a and one of the plurality of lobe flanges 52a extends a larger distance radially from hole 50 than the other two of the plurality of lobes 68b, 68c and the other two of the plurality of lobe flanges 52a, 52b. By having only one of the lobes 68a and lobe flanges 52a extend radially farther out than lobes 68b, 68c and lobe flanges 52b and 52c, elastomeric assembly 40 can only be inserted into aperture 66 in one single circumferential orientation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An isolator assembly in combination with a supporting structure supporting a vehicle body of a vehicle, the combination comprising:
a closed aperture defined by a planar wall of said supporting structure; and
an elastomeric assembly disposed within said closed aperture, said elastomeric assembly movable between a first position where axial movement of said elastomeric assembly within said aperture is permitted and a second position where axial movement of said elastomeric assembly within said aperture is prohibited; wherein
an outer radial surface of said elastomeric assembly has an interference fit with an inner radial surface of said closed aperture when said elastomeric assembly is in said second position.

2. The isolator assembly according to claim 1, wherein said elastomeric assembly is rotatable between said first and second positions.

3. The isolator assembly according to claim 1, wherein a circumferential clearance is provided between said aperture and said elastomeric assembly when said elastomeric assembly is in said first position.

4. The isolator assembly according to claim 1, wherein said aperture defines at least one lobe, said elastomeric assembly defining at least one lobe flange corresponding to said at least one lobe.

5. The isolator assembly according to claim 4, wherein a circumferential clearance is provided between said aperture and said elastomeric assembly when said elastomeric assembly is in said first position.

6. The isolator assembly according to claim 4, wherein said at least one lobe flange defines a retention flange, said retention flange prohibiting axial motion of said elastomeric assembly within said aperture when said elastomeric assembly is in said second position.

7. The isolator assembly according to claim 1, wherein said elastomeric assembly defines a hexagonal structure.

8. The isolator assembly according to claim 1, further comprising a hanger pin disposed within a hole defined by said elastomeric assembly, said hanger pin being attached to said exhaust system.

9. The isolator assembly according to claim 1, wherein said aperture defines a plurality of lobes, said elastomeric assembly defining a plurality of lobe flanges corresponding to said plurality of lobes.

10. The isolator assembly according to claim 9, wherein a first one of said plurality of lobes extends radially further than a second one of said plurality of lobes and a first one of said plurality of lobe flanges extends radially further than a second one of said plurality of lobe flanges.

11. The isolator assembly according to claim 9, wherein a circumferential clearance is provided between said aperture and said elastomeric assembly when said elastomeric assembly is in said first position.

12. The isolator assembly according to claim 9, wherein at least one of said plurality of lobe flanges defines a retention flange, said retention flange prohibiting axial motion of said elastomeric assembly within said aperture when said elastomeric assembly is in said second position.

13. The isolator assembly according to claim 9, wherein said elastomeric assembly defines a hexagonal structure.

14. The isolator assembly according to claim 9, wherein said elastomeric assembly is rotatable between said first and second positions.

15. The isolator assembly according to claim 9, further comprising a hanger pin disposed within a hole defined by said elastomeric assembly, said hanger pin being attached to said exhaust system.

16. The isolator assembly according to claim 1, wherein said elastomeric body directly engages said planar wall of said supporting structure.

17. The isolator assembly according to claim 1, wherein the second insert defines a stop limiting rotation of said elastomeric assembly within said closed aperture.

18. The isolator assembly according to claim 1, wherein said elastomeric body defines a plurality of lobe flanges retaining said elastomeric assembly within said closed apertures.

19. The isolator assembly according to claim 1, wherein said second insert defines a plurality of lobe flanges retaining said elastomeric assembly within said closed apertures.

20. The isolator assembly according to claim 1, wherein the outer radial surface of said elastomeric assembly has an interference fit with the inner radial surface of a flange forming said closed aperture.

21. An isolator assembly in combination with a supporting structure supporting a vehicle body of a vehicle, the combination comprising:

a closed aperture defined by a planar wall of said supporting structure; and an elastomeric assembly disposed within said closed aperture, said elastomeric assembly movable between a first position where axial movement of said elastomeric assembly within said aperture is permitted and a second position where axial movement of said elastomeric assembly within said aperture is prohibited; wherein said elastomeric assembly includes a first insert, a second insert fully surrounding said first insert and a single piece elastomeric body disposed between said first and second inserts; and an open circumferential void is formed between said first and second inserts.

\* \* \* \* \*